E. B. LIGHT.
Whip-Tip Ferrules.

No. 154,876.  Patented Sept. 8, 1874.

WITNESSES:
A. W. Almquist
C. Sedgwick

INVENTOR:
E. B. Light
BY
ATTORNEYS.

UNITED STATES PATENT OFFICE.

EDWARD B. LIGHT, OF WESTFIELD, MASSACHUSETTS, ASSIGNOR TO EDWARD B. LIGHT & CO., OF SAME PLACE.

IMPROVEMENT IN WHIP-TIP FERRULES.

Specification forming part of Letters Patent No. 154,876, dated September 8, 1874; application filed March 28, 1874.

*To all whom it may concern:*

Be it known that I, EDWARD B. LIGHT, of Westfield, in the county of Hampden and State of Massachusetts, have invented a new and Improved Whip-Tip Ferrule; and I do hereby declare that the following is a full, clear, and exact description of the same, reference being had to the accompanying drawing forming a part of this specification, in which—

Figure 1:
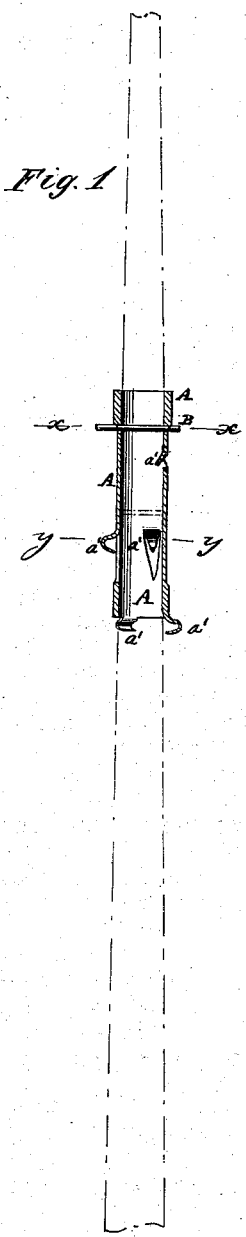
Figure 2:
Figure 3:
Figure 4:

Figure 1 is a longitudinal section of my improved whip-tip ferrule. Fig. 2 is a cross-section of the same taken through the line $x\,x$, Fig. 1. Fig. 3 is a cross-section of the same taken through the line $y\,y$, Fig. 1. Fig. 4 is an end view of the same.

My invention has for its object to furnish an improved device for connecting a whip-tip with the stock; and it consists in a ferrule having teeth formed in the sides thereof and adapted to be driven into the whip-tip and stock, as hereinafter fully described.

A represents the ferrule, into the upper end of which the butt of the whip-tip is inserted, and is secured in place by a rivet, B, passed through said ferrule and tip, as shown in Figs. 1 and 2. In the lower part of the ferrule A, into which the end of the whip-stock is inserted, are angular or pointed teeth $a'$, which are formed of the solid body of the ferrule A by cutting two slits, meeting each other at an angle, the angular strip or flap thus formed being bent up and over, as shown in Figs. 1, 3, and 4, so as to be in proper position for being driven into the whip-stock to secure it in place, and so as not to interfere with the previous ready insertion of the whip-stock. These teeth $a'$ are formed in the middle part of the ferrule A, as also upon its extreme lower edge.

For very light whips the rivet B may be omitted and the ferrule A secured to both the stock and the tip by means of teeth alone.

Having thus described my invention, what I claim as new is—

As a new article of manufacture, a whip-tip ferrule, A, provided with hook-shaped teeth $a'$ in the body thereof and at one end, the same being formed out of the ferrule, as and for the purpose specified.

EDWARD B. LIGHT.

Witnesses:
J. V. F. RYERSON,
GEORGE H. STOUT.